(12) United States Patent
Paluszek et al.

(10) Patent No.: US 10,811,143 B2
(45) Date of Patent: *Oct. 20, 2020

(54) IN SPACE STARTUP METHOD FOR NUCLEAR FUSION ROCKET ENGINES

(71) Applicant: PRINCETON SATELLITE SYSTEMS, INC., Plainsboro, NJ (US)

(72) Inventors: Michael A. Paluszek, Princeton, NJ (US); Eric M. Ham, Princeton, NJ (US); Yosef Razin, Princeton, NJ (US); Samuel A. Cohen, Princeton, NJ (US)

(73) Assignee: PRINCETON SATELLITE SYSTEMS, INC., Plainsboro, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,236

(22) Filed: Jan. 17, 2019

(65) Prior Publication Data

US 2020/0027570 A1 Jan. 23, 2020

Related U.S. Application Data

(63) Continuation of application No. 14/466,425, filed on Aug. 22, 2014, now Pat. No. 10,229,756.

(Continued)

(51) Int. Cl.
*G21B 1/05* (2006.01)
*G21B 1/00* (2006.01)
(Continued)

(52) U.S. Cl.
CPC .............. *G21B 1/00* (2013.01); *G21B 1/052* (2013.01); *B64G 1/408* (2013.01);
(Continued)

(58) Field of Classification Search
CPC ...... G21B 1/00; G21B 1/052; F02B 2043/106
See application file for complete search history.

(56) References Cited

U.S. PATENT DOCUMENTS 3,254,485 A 6/1966 Bernstein
3,546,019 A 12/1970 Von Doehren et al.
(Continued)

FOREIGN PATENT DOCUMENTS

WO 2013/191779 A2 12/2013
WO 2014/031190 A2 2/2014

OTHER PUBLICATIONS

Pajer, Gary, et al. Modular aneutronic fusion engine. No. PPPL-4761. Princeton Plasma Physics Lab.(PPPL), Princeton, NJ (United States), 2012.*

(Continued)

*Primary Examiner* — Lily C Garner
(74) *Attorney, Agent, or Firm* — Volpe Koenig

(57) ABSTRACT

The invention is for a startup system for nuclear fusion engines in space. The combustion of hydrogen and oxygen produces heat that is used by a heat engine to produce electricity. This can be supplemented by electricity from other operating engines. The exhaust from the combustion is condensed and electrolyzed to produce hydrogen and oxygen once the engine is in operation. This provides a constant source of energy for future startups. The engine is started up at partial power in electricity generation mode and this power replaces the power from the combustion as it grows. The combustor uses the same heat engine as the nuclear engine uses for power generation.

15 Claims, 2 Drawing Sheets

Related U.S. Application Data

(60) Provisional application No. 61/868,629, filed on Aug. 22, 2013.

(51) Int. Cl.
    *F02B 43/10*         (2006.01)
    *F02K 9/08*          (2006.01)
    *B64G 1/40*          (2006.01)
    *F03H 1/00*          (2006.01)

(52) U.S. Cl.
    CPC ........... *F02B 2043/106* (2013.01); *F02K 9/08* (2013.01); *F03H 1/0093* (2013.01); *Y02E 30/10* (2013.01)

(56) References Cited

U.S. PATENT DOCUMENTS

| | | |
|---|---|---|
| 4,234,925 A | 11/1980 | Kitano |
| 4,244,782 A | 1/1981 | Dow |
| 4,265,721 A | 5/1981 | Hackmyer |
| 5,214,981 A | 6/1993 | Weinberger et al. |
| 5,733,421 A | 3/1998 | Pettigrew et al. |
| 6,155,212 A | 12/2000 | McAllister |
| 6,891,173 B2 | 5/2005 | Gammel et al. |
| 7,613,271 B2 | 11/2009 | Rostoker et al. |
| 2006/0065214 A1 | 3/2006 | Flessner |
| 2006/0198485 A1 | 9/2006 | Binderbauer |
| 2006/0267504 A1 | 11/2006 | VanDrie |
| 2009/0000268 A1 | 1/2009 | Yurash |
| 2010/0264656 A1 | 10/2010 | Flood |
| 2011/0026657 A1 | 2/2011 | Laberge |
| 2012/0187906 A1 | 7/2012 | Martiensen et al. |

OTHER PUBLICATIONS

Ehlers, K.W., et al. Conceptual Design of a Neutral-Beam Injection System for the TFTR. No. LBL-4425; CONF-751125-86. California Univ., Berkeley (USA). Lawrence Berkeley Lab., 1975. *Cited in parent application.

Steinhauer, Loren C. "Review of field-reversed configurations." Physics of Plasmas 18.7 (2011): 070501. <https://www.researchgate.net/profile/L_Steinhauer/publication/234887285_Review_of_field-reversed_configurarions/links/5948480da6fdcc70635a28df/Review-of-field-reversed-confitureat5ions.pdf> *Cited in parent application.

Farley, D.R., et al. "Modelling of hydrogen ground state rotational and vibrational temperatures in kinetic plasmas." Journal of Quantitative Spectroscopy and Radiative Transfer 112.5 (2011): 800-819, <https://www.sciencedirect.com/science/article/pii/S0022407310004012.> *Cited in parent application.

Cohen, S. et al. "RF Plasma Heating in the PFRC-2 Device; Motivation, Goals and Methods." AIP Conference Proceedings vol. 1406. No. 1, AIP, 2011, <https://aip.scitation.org/doi/abs/10.1063/1.3665976> *Cited in parent application.

Ryzhkov, S.V. "A field-reversed magnetic configuration and applications of high-temperature FRC plasma." Plasma Physics Reports 37.13 (2011): 1075-1081. <https://link.springer.com/article/10.1134/S1063780X11030135>. (year: 2011) *Cited in parent application.

Pajer, Gary et al. "Modular Aneutronic Fusion Engine." Space Propulsion (May 2012). *Cited in parent application.

Williams, Craig H. et al. Realizing "2001: A Space Odyssey": Piloted Spherical Torus Nuclear Fusion Propulsion Mar. 2005, NASA/TM-2005-213559, AIAA-2001-3805; 50 pages *Cited in parent application.

Tuszewski et al., "Field Reversed Configuration Confinement Enhancement through Edge Biasing and Neutral Beam Injection," Physical Review Letters (2012); 108:255008 (6 pages) *Cited in parent application.

Cohen et al., "Stochastic ion heating in a field-reversed configuration geometry by rotating magnetic fields," Physics of Plasmas (2007); 14:072508 (13 pages) *Cited in parent application.

Pajer, G., Razin, Y., Paluszek, M., Glasser, A., and Cohen, S., "Modular Aneutronic Fusion Engine," Space Propulsion 2012, AAF-EAS-CNES, 2012. *Cited in parent application.

Paluszek et al., "Direct Fusion Drive for a Human Mars Orbital Mission," International Astronautical Congress, Sep. 2014, IAC14, C4, 6.2 (10 pages) *Cited in parent application.

Landsman et al., "Onset and Saturation of Ion Heating by Odd-Parity Rotating Magnetic Fields in a Filed-Reversed Configuration," Physical Review Letters (2006); 96:015002 (4 pages) *Cited in parent application.

Thomas et al., "Direct Fusion Drive: provide Game-changing power and propulsion in space," Proc. 2oth Conference on Advanced Space Propulsion, Glenn Research Center, Nov. 2014 (35 pages) *Cited in parent application.

Paluszek, M., Hurley, S., Pajer, G., Thomas, S.,Mueller, J., Cohen, S., and Welch D., "Modular Aneutronic Fusion Engine for an Alpha Centauri Mission," DARPA 100 Year Starship Conference, Sep. 2011; 21 pages *Cited in parent application.

Cohen et al., "Formation of Collisionless High-!! Plasmas by Odd-Parity Rotating Magnetic Fields," Physical Review Letters (2007); 98:145002 (5 pages) *Cited in parent application.

Fujita, T., Kamada, Y., Ide, S., Takeji, S., Sakamoto, Y., Isayama, A., Suzuki, T., Oikawa, T., and Fukuda, T., Sustainment of High Confinement in JT-60U Reversed Shear Plasmas, Tech. rep., Japan Atomic Energy Research Institute. *Cited in parent application.

Cheung, A., Binderbauer, M., Liu, F., Qerushi, A., Rostoker, N., and Wessel, F. J., "Colliding Beam Fusion Reactor Space Propulsion System," Space Technologies and Applications International Forum, 2004; pp. 354-361 *Cited in parent application.

Binderbauer et al., "Dynamic Formation of a Hot Field Reversed Configuration with Improved Confinement by Supersonic Merging to Two Colliding High-!! Compact Toroids," Physical Review Letters (2010); 105:045003 (5 pages) *Cited in parent application.

Razin, Y. S., Pajer, G., Breton, M., Ham, E., Mueller, J., Paluszek, M., Glasser, A. H., and Cohen, S. A., "A direct fusion drive for rocket propulsion," Acta Astronautica, No. 1, Dec. 2014; 105-145-155 *Cited in parent application.

Razin et al., "Modular Aneutronic Fusion Engine," International Astronautical Congress, Oct. 2012 IAC-12,C4,7-C3.5,10 (9 pages) *Cited in parent application.

Marcus et al., "JET Experiements with 120 keV 3He and 4He Neutral Beam Injection and Neutron Diagnosis Applications", Feb. 20, 1992, 8 pages.

\* cited by examiner

IN SPACE STARTUP METHOD FOR NUCLEAR FUSION ROCKET ENGINES

CROSS REFERENCE TO RELATED APPLICATIONS

This application is a continuation of U.S. patent application Ser. No. 14/466,425, filed Aug. 22, 2014, now U.S. Pat. No. 10,229,756 B2 which issued on Mar. 12, 2019, which claims the benefit of U.S. Provisional Application No. 61/868,629 filed Aug. 22, 2013, which are incorporated herein by reference in their entirety.

FIELD OF INVENTION

The present invention generally relates to the startup or restart of nuclear fusion engines in space.

BACKGROUND

Nuclear fusion engines will be needed to power the next generation of robotic spacecraft and future human missions to Mars.

Starting up a fusion reaction requires considerable power for a short period of time. The power is used to heat the reactants to fusion temperatures until the reaction is self-sustaining. It also energizes the superconducting coils used to confine the plasma and powers auxiliary equipment.

The source of the startup power is a major concern for nuclear fusion engines. It must be reliable and available at all times. It may have to last for several years without being used.

Terrestrial fusion reactors use electric power from the grid to start their reactions. Without a source of external power a space fusion engine would need to be so reliable that it would never shutdown unless it were near an orbiting power station.

Yurash (U.S. Patent Application Publication No. 2009/0000268) discloses a fusion rocket requiring an alpha particle source to start the reaction but does not disclose a method to power the alpha particle source.

Flood (U.S. Patent Application Publication No. 2010/0264656) discloses an orbital solar station that could be used to start up a fusion reactor. Orbiting power stations would require large solar arrays and large power storage that could deliver high power in short bursts. The largest solar power system to date, on the International Space Station, would be too small to start proposed fusion engines. Even if such stations could be built, they would need to be located in orbits, such as around Mars, where spacecraft were likely to go. If the fusion engine were not operational, a separate space tug would be required to bring the power station and this would greatly limit the applicability of the fusion engine technology.

Williams, et al (Realizing "2001: A Space Odyssey": Piloted Spherical Torus Nuclear Fusion Engine", NASA/TM-2005-213559) discloses an onboard fission reactor for fusion reactor startup. This has the disadvantage of being heavy and dangerous due to the presence of highly radioactive material. For example, in the event of a catastrophic accident, the spacecraft may to reenter the Earth's atmosphere, spreading radioactive material over a broad area. The safety problems associated with fission reactors have prevented the widespread use of fission reactors in spacecraft.

There are numerous energy storage options that can be considered. Weinberger (U.S. Pat. No. 5,214,981) discloses a superconducting magnet bearing flywheel for energy storage. This system is an alternative to the system disclosed in this application. Its advantage over other flywheel system is that the electromagnetic bearings are superconducting and do not require power which limit the time other systems can store power. Nonetheless, it would still require that this, an active system, be kept operating for long periods of time. In addition, the large flywheels present an operational safety hazard. It is also not clear that the power to mass ratio is suitable for this application.

Fuel cells are known devices that could provide power for startup. Von Doehren (U.S. Pat. No. 3,546,019) discloses fuel cells for use as a battery. Fuel cells were used extensively in the Apollo program for electricity generation. Pettigrew (U.S. Pat. No. 5,733,421) discloses a hydrogen oxygen fuel cell. A fuel cell converts the chemical reaction into electricity directly. Fuel cells do not have the high rates of discharge required. Fuel cells could be an element of the fusion reactor start up system but by themselves are insufficient.

Batteries are a well-known electricity storage technology. Batteries, however, have very low energy densities. For example, a Cobalt Lithium Ion has an energy density of 0.875 MJ/kg. This is much too low for a fusion reactor startup. In contrast, hydrogen fuel contains 142 MJ/kg. In addition, batteries cannot discharge fast enough for this application.

Batteries or fuel cells could be supplemented by supercapacitors or supercapacitors to attain the high discharge rates. Martienssen (U.S. Patent Application Publication No. 2012/0187906) discloses the use of supercapacitors for automobiles with batteries or fuel cells. This reduces the wear and tear on batteries and enables both fuel cells and batteries to deliver high power. However, the energy density of supercapacitors is very low, 0.018 MJ/kg, and the startup system would require a large bank of supercapacitors to meet the power requirements.

Electrolysis is a well-known process for breaking water into hydrogen and oxygen. Hackmyer (U.S. Pat. No. 4,265,721, May 5, 1981) discloses a novel system using microwave energy. Such systems could be used to recover fuel for future engine startups but by themself do not comprise a solution to the problem.

If the spacecraft has multiple fusion engines that can produce power then the other engines can provide the startup power. However, this does not solve the problem of a situation in which all of the engines shut down.

SUMMARY OF THE INVENTION

The present invention provides a method for starting up nuclear fusion engines in space and restarting engines that have shut down. Therefore, our invention has the following objects and advantages: to provide startup up power for a nuclear fusion rocket engine; to provide a constant source of fuel for the startup process to allow for unlimited startups; to use existing heat engines and power generators built into the fusion engine so as to minimize the mass of the system.

Deuterium can be used interchangeably with hydrogen in this invention. Deuterium is used as fuel for a fusion engine and it may be advantageous to use it for startup as well. However, common hydrogen, or protium, may be used.

The combustion of hydrogen and oxygen produces heat that is used by a heat engine to produce electricity. This can be supplemented by electricity from other operating engines if they are available. 1 kg Hydrogen produces 142 MJ/kg of energy when combusted with 8 kg of oxygen.

The exhaust from the combustion is condensed and electrolyzed to produce hydrogen and oxygen once the engine is in operation. This provides a constant source of fuel for future startups.

The engine is started up at partial power in electricity generation mode and this power replaces the power from the combustion as the engines return to full power.

The combustor uses the same heat engine as the nuclear fusion engine uses for power generation.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The present invention advantageously provides a method for starting up nuclear fusion rocket engines in space.

During the course of this description like numbers will be used to identify like elements according to the different views, which illustrate the invention.

Figure 1:
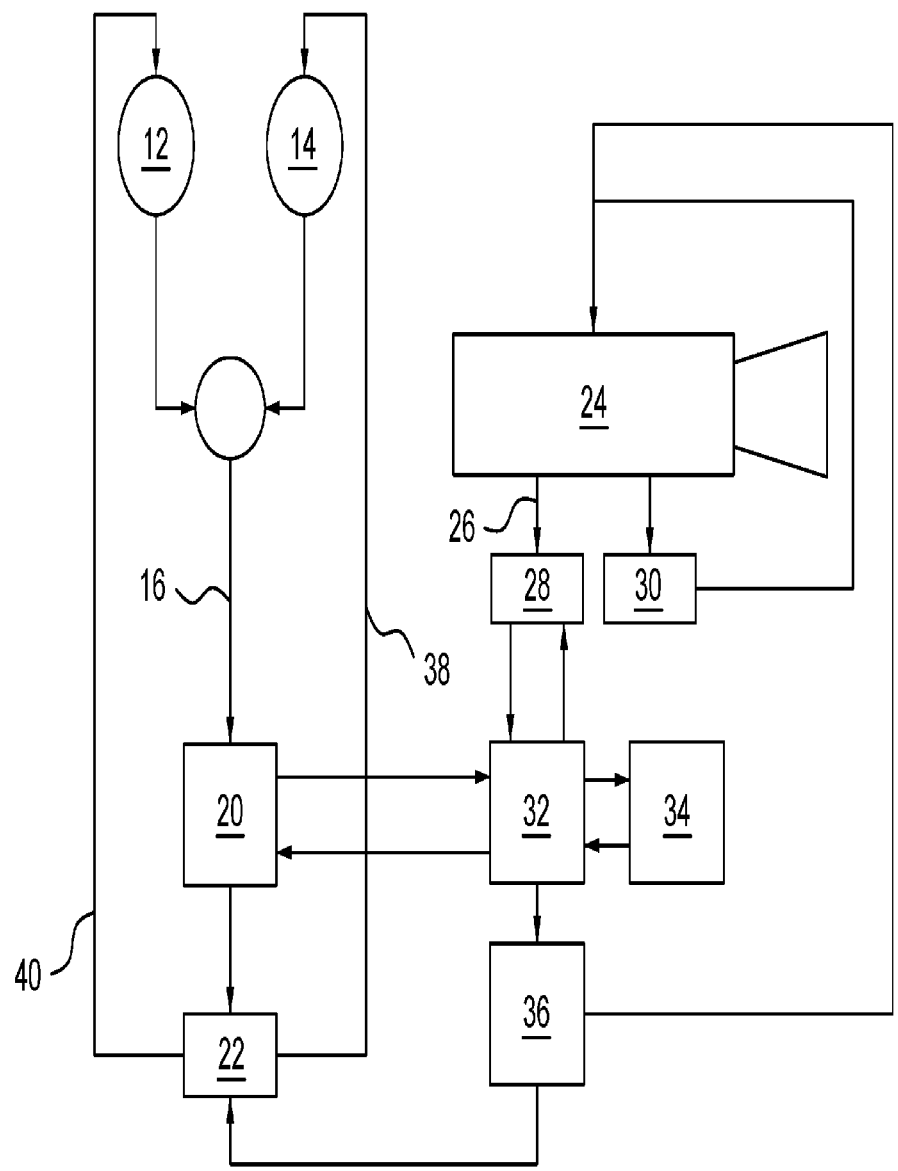
FIG. 1 is a diagram of the system.
Figure 2:
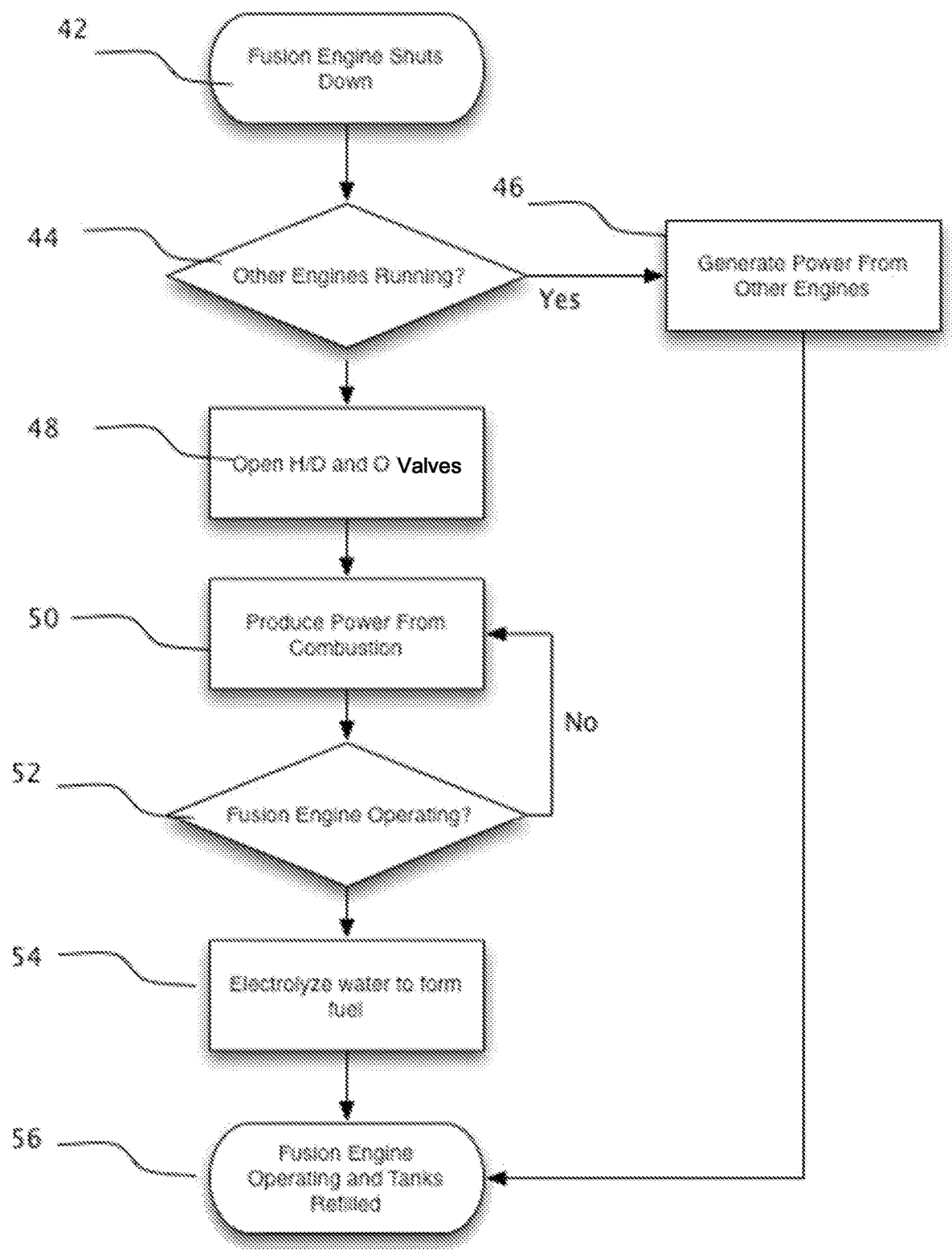
FIG. 2 is a flow diagram showing system operation.

An embodiment of the invention is shown in FIG. 1. This diagram shows the system operation. FIG. 2 shows a flowchart for the startup procedure.

Referring to FIG. 1, liquid hydrogen, for example, may be stored in a cryogenic fuel tank 12. This would be similar to the fuel tanks used for the nuclear fusion engine fuel. Liquid oxygen, for example, may be stored in a cryogenic fuel tank 14. The oxygen and hydrogen are combined in a combustion chamber which produces hot exhaust gases 16, i.e. water vapor. Less than 1 kg of deuterium and/or hydrogen is needed to start reactors ranging between 1 to 20 MW.

The exhaust gases 16 flow to a heat exchanger 20. The heat exchanger 20 removes most of the heat from the exhaust gas 16. The heat flows to a heat engine 32 that converts the heat energy to electricity for use in starting up a fusion engine heating system 24.

An electrolysis unit converts the water into hydrogen and oxygen, 22. Electrolysis is the process by which a non-spontaneous reaction is forced to occur using a direct current. In order for electrolysis to occur, a specific apparatus must be assembled. This apparatus must include a container, a power source, and conductors that allow electricity to flow from the power source to the substance that is in the container. Each conductor will function as either an anode or a cathode when the direct current is present. At the negatively charged cathode, a reduction reaction takes place in which electrons from the power source are given to positively charged hydrogen cations such that $H_2$ gas is formed.

$$2H+(aq)+2e-\rightarrow H_{2(g)}$$ (Equation 1)

At the positively charged anode, an oxidation reaction occurs in which $O_2$ gas is formed and electrons flow to the anode to complete the circuit.

$$2H_2O(l)\rightarrow O_2(g)+4H+(aq)+4e-$$ (Equation 2)

Ideally, the amount of hydrogen generated is twice the number of moles of oxygen, however this is rarely the case. The fusion heating system 24 requires electric power to operate. In an embodiment, fusion heating system 24 consists of radio frequency antennas that generate radio waves to heat the plasma. These produce rotating magnetic fields. The antennas are arranged in an odd-parity arrangement so the sign of the rotating magnetic fields flips across the centerline of the field reversed configuration plasma. To start the fusion engine, Deuterium may be heated to about 50 kEV and Helium-3 may be heated to about 100 kEV. Roughly 1 MW for 10 seconds should be produced for the engine to start.

Certain types of nuclear fusion reactors produce power from their radio-frequency heating systems 30 by running it in reverse. In this mode, the antennas absorb radio frequency (RF) energy produced by the motion of the charged particles in the magnetic fields in the reactor. This is known as synchrotron radiation. The radio frequency waves induce electric currents in the antennas that can be used for powering electrical machinery. This is similar to the operation of monostatic radar. This can produce electricity once the fusion reaction is starting.

Waste heat 26 from bremsstrahlung and other sources is removed using heat exchangers 28. This heat goes to the heat engine 32. Electricity is generated by the heat engine 32.

Limited surge power, if required, may be provided by supercapacitors or flywheels, 34. These devices store large amounts of power for short durations and can discharge rapidly. This may only be needed if a very short duration pulse was needed during the startup process.

The heat engine 32 drives an electric generator 36 which provides power to electrolysis unit 22. Oxygen 38 from the electrolysis unit 22 flows to the oxygen storage tank 14. Hydrogen 40 from the electrolysis unit 22 flows to the hydrogen storage tank 12.

FIG. 2 shows a flow diagram of the operation.

The shutdown in a fusion engines is detected, step 42.

If there are other engines, they are checked to see if they are operating, 44. If one is operating it is used to startup the shutdown fusion engine, step 46.

If none are operating, the valves for the hydrogen and oxygen tanks are opened, step 48. Utilizing well-known fuel cell techniques, the hydrogen and oxygen fuel is combined in the combustion chamber to produce energy which is ultimately used to produce electrical power, for example at heat engine 32.

Power from the combustion is used to start up the engine, step 50. The combustion of the fuel and oxidizer produces heat. This is used to heat the working fluid in the heat engine that drives an electric generator. Many heat engines, such as Striling or Brayton cycle can be used for this purpose. The electric generator can also be of many types including DC or AC generators.

Engine operation is observed, 52. If the engine is operating, the power from the electric generator 36 is sent to the electrolysis unit to being the process to recover fuel, step 54.

The system goes into standby when the fuel is recovered and the fusion engine is operating, step 56.

Examples of fusion powered engines for use in space may be found in International Application No. PCT/US2013/040520 filed on May 10, 2013 and International Patent Application No. PCT/US2013/033767 filed on Mar. 25, 2013, the disclosures of which are incorporated by reference as if fully disclosed herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for providing power for startup of a nuclear fusion reactor, the method comprising:
   generating, in a startup system for a field-reversed configuration (FRC) fusion reactor, heat energy by combusting a fuel in one or more combustion chambers, wherein the combusting of the fuel produces a combustion product;
   generating, by a heat engine, a first electrical power from the heat energy of the startup system;
   starting, by one or more radio frequency antennas of the FRC fusion reactor, a fusion nuclear reaction of plasma inside the FRC fusion reactor using the first electrical power;
   generating, by the heat engine, a second electrical power from heat generated by the fusion nuclear reaction; and
   producing, using the second electrical power, the fuel for the startup system from the combustion product.

2. The method of claim 1 in which the fuel is a combination of a hydrogen isotope and oxygen.

3. The method of claim 2 in which the hydrogen isotope is deuterium.

4. The method of claim 1 further comprising:
   storing a portion of the second electrical power in a power storage device.

5. The method of claim 4 in which said power storage device is one or more supercapacitors.

6. The method of claim 4 in which said power storage device is one or more flywheels.

7. The method of claim 1, wherein the FRC fusion reactor comprises a plurality of superconducting flux coils around a reactor chamber in which an induced current is generated in response to an odd-parity rotating magnetic field, wherein the induced current generates a magnetic confinement field that magnetically confines the plasma.

8. The method of claim 1, further comprising:
   stopping the startup system from generating the first electrical power after the fusion reaction is started.

9. The method of claim 8, further comprising:
   stopping the fusion reaction after a period of time.

10. A nuclear fusion reactor system comprising:
    a startup system for a field-reversed configuration (FRC) fusion reactor that generates heat energy by combusting a fuel in one or more combustion chambers, wherein the combusting of the fuel produces a combustion product;
    a heat engine that generates a first electrical power from the heat energy of the startup system and generates a second electrical power from the heat energy generated by the FRC fusion reactor;
    one or more radio frequency antennas that start a fusion nuclear reaction of plasma inside the FRC fusion reactor using the first electrical power; and
    an electrolysis unit that converts the combustion product into the fuel for the startup system.

11. The system according to claim 10, wherein the fuel is a combination of a hydrogen isotope and oxygen.

12. The system according to claim 11, wherein the hydrogen isotope is deuterium.

13. The system according to claim 10, wherein the FRC fusion reactor comprises a plurality of superconducting flux coils around a reactor chamber in which an induced current is generated in response to an odd-parity rotating magnetic field, wherein the induced current generates a magnetic confinement field that magnetically confines the plasma.

14. The system according to claim 10, wherein the startup system stops generating the first electrical power after the fusion reaction is started.

15. The system according to claim 14, wherein the fusion reaction is stopped after a period of time.

* * * * *